Dec. 5, 1961 N. EASTEP 3,011,724
TREE SPRAYER
Filed Jan. 13, 1960 2 Sheets-Sheet 2
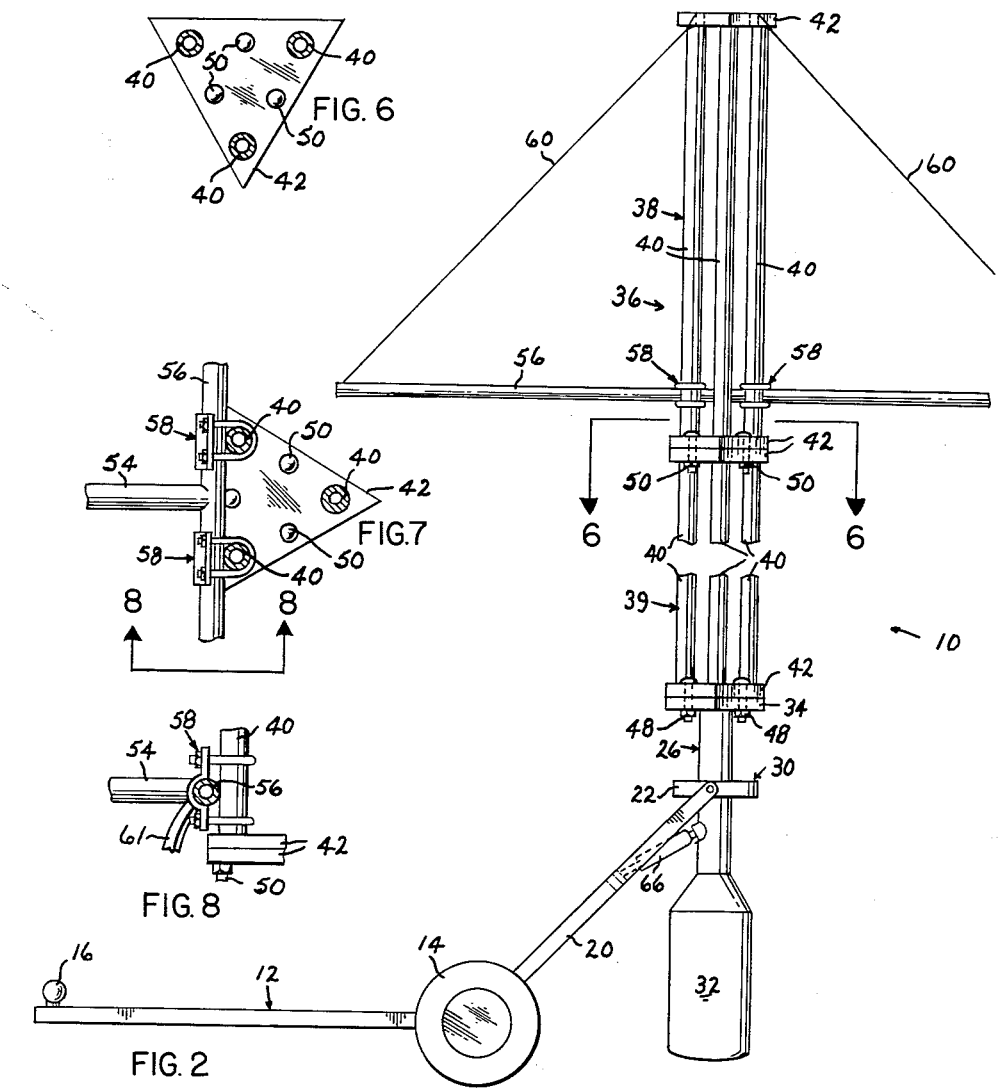
NOBLE EASTEP
INVENTOR.
BY *Loyal J. Miller*
ATTORNEY

United States Patent Office 3,011,724
Patented Dec. 5, 1961

3,011,724
TREE SPRAYER
Noble Eastep, Elmore City, Okla.
Filed Jan. 13, 1960, Ser. No. 2,164
3 Claims. (Cl. 239—286)

The present invention relates to spraying devices and more particularly to a portable power sprayer.

Most of the power spraying devices, as shown by the prior art, are structurally formed for spraying relatively low foliage such as row crops or the under side of trees or the like.

It is, therefore, the principal object of the instant invention to provide a power operated spraying device which may be towed behind a tractor, or the like, and wherein a laterally extending spray head may be adjustably positioned vertically on a supporting mast for spraying trees and relatively high growth from an elevated position.

Another object is to provide an all purpose mobile sprayer which can be towed by any type of conventional farm powered equipment for the application of herbicides, insecticides, fumigants, disinfectants, liquid fertilizers or any other type of chemical or liquid solutions for treating soils, grasses, gardens, orchards or fields.

An additional object is to provide a sprayer of this class having a laterally projecting spray head for clearing relatively high objects such as tall growing shrubs or trees which may reach a heighth of 30 feet or more and which can be adjustably positioned for equally effective spraying of relatively short foliage.

Still another object is to provide a sprayer of this class by which the spray medium is applied from above the foliage in a manner common to aircraft type spraying thereby eliminating the expense of an airborne sprayer and wherein such spraying can be accomplished in locations not suited for airborne equipment.

An additional object is to provide a sprayer of this class which will more effectively cover the soil with a spray medium, for example, for chemically treating the soil or killing weeds in a row crop, thus eliminating much of the waste of the spray medium when compared with spraying by airborne equipment.

Another important object is to provide a sprayer which features a "floating mast" as a spray head support wherein the mast retains its vertical position and consequent horizontal position of the laterally extending spray head regardless of the evenness or unevenness of the terrain over which the sprayer support is being towed.

Still another object is to provide a sprayer of this class which features an elongated laterally projecting spray head for covering a relatively wide swath or area.

The present invention accomplishes these and other objects by providing a wheel supported frame having a pair of rearwardly and upwardly converging supports pivotally connected with a tubular member intermediate its ends. The lower end portion of the tubular member is enlarged to form a counterweight. A mast is connected with and carried vertically by the upper end of the tubular member while a laterally extending vertically adjustable spray head is connected with the upper end portion of the mast.

Other objects will be apparent from the following description when taken in conjunction with the accompanying two sheets of drawings, wherein:

FIGURE 1 is a fragmentary front elevational view of the device;

FIGURE 2 is a fragmentary side elevational view of FIG. 1;

FIGURE 3 is a fragmentary vertical cross-sectional view through the tubular member;

FIGURE 4 is a fragmentary horizontal cross-sectional view, partly in elevation, taken substantially along line 4—4 of FIG. 1;

FIGURE 5 is a view similar to FIG. 4 taken substantially along the line 5—5 of FIG. 1;

FIGURE 6 is a horizontal cross-sectional view, partly in elevation, taken substantially along line 6—6 of FIG. 2;

FIGURE 7 is a fragmentary horizontal cross-sectional view, partly in elevation, taken substantially along line 7—7 of FIG. 1; and, FIGURE 8 is a fragmentary elevational view, partly in section, taken substantially along line 8—8 of FIG. 7.

Like characters of reference designate like parts in those figures of the drawings in which they occur.

In the drawings:

The reference numeral 10 indicates the device, as a whole, comprising a horizontal frame 12 having a pair of wheels 14 journaled on horizontal axles, not shown, connected with the rearward end of the frame. The foreward end of the frame is provided with a ball 16 for connection with a conventional trailer hitch on a tractor, or the like, not shown. A pair of support members 18 and 20 are connected to the rearward end of the frame 12, adjacent the wheels 14, and extend rearwardly and upwardly in converging relation where they are connected to a ring member 22 by a first pair of relatively short rod-like hinge pins 24 extended horizontally through the upper end portion of the respective support and the wall of the ring 22.

A tubular member 26 is coaxially disposed within the ring 22 and is connected thereto, intermediate its ends, by a second pair of similar hinge pins 28 rigidly connected to the periphery of the tubular member in diametric aligned relation. The free end portions of the pins 28 are journaled by the wall of the ring 22 in perpendicular relation with respect to the axis of the pins 24 thus forming a universal joint 30 which supports the tubular member 26. The tubular member 26 is provided with a circumferentially enlarged lower end portion 32, formed of concrete, or any other desired material, and of a desired size for the purposes more fully explained hereinbelow.

The upper end of the tubular member 26 is provided with an annular outstanding flange 34. A mast, indicated generally at 36, and comprising a plurality of individual sections, is vertically supported in superimposed relation by the flange 34. Two of the mast sections are shown and indicated by the numerals 38 and 39.

Each section or portion of the mast is preferably formed of three tubular members 40 arranged in spaced-apart relation defining an equilateral triangle. The opposing ends of each of the mast members 40 are rigidly connected to triangular-shaped plates 42. The lowermost mast section 39 includes a shaft 44 centrally connected to the lower surface of the plate 42 whereby the shaft 44 is closely received by the bore 46 of the tubular member 26 while the plate 42 flatly contacts the upper surface of the flange 34. This plate 42, connected with the shaft 44, may be bolted to the flange 34 by bolt and nut means 48 or these bolts may be omitted thus permitting rotation of the mast 36 about its vertical axis. The upper end of the mast section 39 has its end plate 42 flatly contacting the end plate of the mast section 38 with the respective mast members 40 in vertical aligned relation. Bolt and nut means 50 rigidly connect these end plates in face to face relation. The mast sections 38 and 39 may be formed of any desired length, for example, in 10 feet lengths, and a desired number of sections may then be similarly connected together in vertically aligned relation. I have found that for most practical purposes three of such mast sections provide a sufficient height for spraying trees or the like.

A spray head 52, comprising a plurality of tubular members 54 removably joined together in end abutting relation, is connected at one end in perpendicular relation to a tubular member 56 medially its ends thus forming a T-shaped spray head. The tubular member 56 is connected to two of the mast members 40 by clamp means 58 whereby the clamp means may be adjustably positioned vertically on the mast members. The spray head 52 has the leg portions 54 projecting laterally of the mast 36 in substantially perpendicular relation with respect to the vertical axis of the mast and is supported in such position by a plurality of guy wires 60, or the like. The head portion 56 of the T-shaped spray head is longitudinally aligned with the direction of travel of the device. The spray head 52 may be positioned at the desired height on either of the mast sections 38 or 39 by simply moving the clamp means 58 and adjusting the guy wires 60. Flexible conduit means 61, connected with a pump and reservoir, neither of which are shown, is connected to the spray head 52 for supplying the latter with a spraying medium under pressure. The spray head is provided with a plurality of conventional spray nozzles 62 in communication with the bore of the spray head for ejecting the fluid spray material. Certain ones of the spray heads are provided with oppositely disposed openings, as at 64, for directing spray material outwardly of the path of the frame 12 and toward the frame in order to insure spraying all of the foliage below the spray head.

*Operation*

Gravitational attraction for the enlarged end portion 32 maintains the mast 36 vertically disposed as the frame 12 is towed behind a tractor, or the like. As the frame is towed across uneven or sloping ground, the tubular member 26 pivots within its respective supporting pins 24 or 28 thus permitting the counterweight 32 to maintain the mast vertically disposed. Thus the counterweight provides a floating action for the mast as the frame is alternately tilted from side to side when passing over uneven surfaces. As an aid to prevent tilting or vertical swinging movement of the spray head, a pair of conventional aircraft type shock absorbers 66 are connected at one end by a ball and socket joint 67 to the periphery of the tubular member 26 in spaced-apart relation and are pivotally connected at their opposite ends to a support brace adjacent the respective support 18 and 20. A hydraulic cylinder 69 is interposed between the shock absorbers 66 and similarly connected at its respective ends to the tubular member 26 and brace 68, respectively. This hydraulic cylinder 69 is connected to the conventional hydraulic system of the tractor, not shown, whereby the cylinder may be employed for tilting the mast forwardly over the frame 12 in order that the spray head 52 may be manually adjusted to the desired height.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A spray device, including: a wheel supported frame having a pair of rearwardly and upwardly converging supports; a ring pivotally connected with the converging end portions of said supports; a tubular member pivotally connected intermediate its ends within and to said ring for forming a universal joint; a sectional mast connected with and supported vertically by said tubular member, each section of said mast comprising three tubular members arranged to define, in horizontal cross section, an equilateral triangle, and an end plate connected with the respective opposing ends of said tubular mast members, said tubular member having an enlarged lower end portion forming a counterweight responsive to gravitational attraction for maintaining said mast vertical in a floating type action when the mast is displaced from its vertical position by movement of said frame; a laterally projecting nozzle equipped spray head connected with the upper end portion of said mast; and flexible conduit means conveying a spray fluid under pressure to said spray head.

2. A spraying device, including: a wheel supported frame having a pair of rearwardly and upwardly converging supports; a ring positioned between the converging end portions of said supports; a first pair of pins connected with said supports and pivotally connected to diametrically opposite sides of said ring; a tubular member coaxially position within said ring; a second pair of pins extending between and connected with said ring and said tubular member intermediate the ends of the latter and rotated 90° with respect to said first pair of pins for forming a universal joint; an elongated sectional mast connected with and supported vertically by said tubular member, each section of said mast comprising three tubular members arranged to define, in horizontal cross section, an equilateral triangle, and an end plate connected with the respective opposing ends of said tubular mast members, said tubular member having an enlarged lower end portion forming a counterweight responsive to gravitational attraction for maintaining said mast vertical in a floating type action when the mast is displaced from its vertical position by movement of said frame; a laterally projecting nozzle equipped spray head adjustably connected vertically to the upper end portion of said mast; and flexible conduit means conveying a spray fluid under pressure to said spray head.

3. A spraying device, including: a wheel supported frame having a pair of rearwardly and upwardly converging supports; a ring between the converging end portions of said supports; a first pair of aligned pins extending between opposing sides of said ring and said supports and pivotally mounting said ring between said supports; a tubular member coaxially positioned within said ring; a second pair of aligned pins extending between and connected with said ring and said tubular member intermediate the ends of the latter and rotated 90° with respect to said first pair of pins for forming a universal joint; a sectional mast connected with and vertically supported by said tubular member, each section of said mast comprising three tubular members arranged to define, in horizontal cross section, an equilateral triangle, and an end plate connected with the respective opposing ends of said tubular mast members, said tubular member having a circumferentially enlarged lower end portion forming a counterweight for maintaining said sectional mast upright in response to gravitational attraction for said counterweight when the mast is tilted by movement of said frame; a T-shaped nozzle equipped spray head adjustably connected vertically to the upper end portion of the uppermost mast section; and flexible conduit means conveying a fluid spray under pressure to said spray head.

References Cited in the file of this patent
UNITED STATES PATENTS 2,432,309    Gore _____ Dec. 9, 1947

FOREIGN PATENTS 467,507    Germany _____ Oct. 26, 1928